US009398241B2

United States Patent
Ito et al.

(10) Patent No.: US 9,398,241 B2
(45) Date of Patent: Jul. 19, 2016

(54) ELECTRONIC DEVICE, CONTROL METHOD THEREFOR AND RECORDING MEDIUM

(71) Applicant: Olympus Corporation, Shibuya-ku, Tokyo (JP)

(72) Inventors: Junichi Ito, Tokyo (JP); Tsuyoshi Yaji, Kawagoe (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/604,953

(22) Filed: Jan. 26, 2015

(65) Prior Publication Data

US 2015/0138393 A1    May 21, 2015

Related U.S. Application Data

(63) Continuation of application No. PCT/JP2014/063567, filed on May 22, 2014.

(30) Foreign Application Priority Data

Oct. 1, 2013    (JP) .................................. 2013-206300

(51) Int. Cl.
*H04N 5/44*    (2011.01)
*G06K 1/12*    (2006.01)
(Continued)

(52) U.S. Cl.
CPC .. *H04N 5/44* (2013.01); *G06K 1/12* (2013.01); *G06K 7/00* (2013.01); *G06K 9/183* (2013.01);
(Continued)

(58) Field of Classification Search
CPC ... G08B 13/19261; H04N 7/185; F41G 3/165

USPC .................................................. 348/143–160
See application file for complete search history.

(56) References Cited

U.S. PATENT DOCUMENTS 7,328,848 B2    2/2008    Xia et al.
7,957,765 B1*   6/2011    Causey ............... H04M 1/0256
                                              455/550.1
(Continued)

FOREIGN PATENT DOCUMENTS

JP    2003-317051    11/2003
JP    2005-182629    7/2005
(Continued)

OTHER PUBLICATIONS

Written Opinion of the International Searching Authority for PCT/JP2014/063567 (4 pgs.) with translation (2 pgs.).
(Continued)

*Primary Examiner* — Andy Rao
(74) *Attorney, Agent, or Firm* — John C. Pokotylo; Straub & Pokotylo (57) ABSTRACT

In an electronic device which is capable of displaying a plurality of pieces of information which may be obtained by an imaging operation, and in a first display format, a system controller makes a generating unit which generates code information generate a single piece of code information including a plurality of pieces of information and makes a rear-side display unit display a picture of the generated code information. In a second display format, the generating unit which generates code information is made to generate a plurality of pieces of code information which individually include a plurality of pieces of information and the rear-side display unit is made to display pictures of the generated code information sequentially one by one.

12 Claims, 8 Drawing Sheets

(51) Int. Cl.
*G06K 7/00* (2006.01)
*H04W 76/02* (2009.01)
*G06K 9/18* (2006.01)
*G06T 1/20* (2006.01)
*H04N 1/21* (2006.01)
*H04N 5/067* (2006.01)
*H04N 5/445* (2011.01)

(52) U.S. Cl.
CPC ............. *G06T 1/20* (2013.01); *H04N 1/2129* (2013.01); *H04N 5/067* (2013.01); *H04N 5/445* (2013.01); *H04W 76/02* (2013.01)

(56) References Cited

U.S. PATENT DOCUMENTS

| | | |
|---|---|---|
| 2006/0054695 A1 | 3/2006 | Owada |
| 2006/0071077 A1 | 4/2006 | Suomela |
| 2007/0013721 A1* | 1/2007 | Vau .................. G06K 9/00221 |
| | | 345/660 |
| 2008/0298305 A1 | 12/2008 | Nakamura |
| 2012/0224071 A1* | 9/2012 | Rothschild ............. H04W 4/02 |
| | | 348/207.11 |

FOREIGN PATENT DOCUMENTS

| | | |
|---|---|---|
| JP | 2007-028575 | 2/2007 |
| JP | 2007-215120 | 8/2007 |
| JP | 2008-211507 | 9/2008 |
| JP | 4416392 | 2/2010 |

OTHER PUBLICATIONS

Notice of Rejection Ground for Japanese Patent Application Serial No. 2013-206300, mailed Nov. 11, 2014 (2 pgs.), with translation (2 pgs.).

Decision to Grant for Japanese Patent Application Serial No. 2013-206300, mailed Dec. 2, 2014 (3 pgs.), with translation (3 pgs.).

Official Communication to Japanese Application No. 2014-260269, mailed on Oct. 6, 2015 (2 pgs.).

* cited by examiner

ELECTRONIC DEVICE, CONTROL METHOD THEREFOR AND RECORDING MEDIUM

CROSS-REFERENCE TO RELATED APPLICATIONS

This application is based upon and claims the benefit of priority of the prior Japanese Patent Application No. 2013-206300, filed October 1, 201a13, the entire contents of which are incorporated herein by reference.

This is a Continuation Application of PCT Application No. PCT/JP2014/063567, filed May 22, 2014, which was not published under PCT Article 21(2) in English.

FIELD

The present invention relates to an electronic device which is capable of displaying a plurality of pieces of information which may be obtained by a imaging operation on a display unit, a control method therefor, and a recording medium.

BACKGROUND

Techniques are known in which information included in code information such as a one-dimensional barcode or a two-dimensional barcode is used for automating a website browsing operation or a wireless LAN (Local Area Network) connection operation, as stated in Japanese Patent No. 4416392 and Japanese Laid-open Patent Publication No. 2008-211507. Today, these techniques are in general use. In addition, techniques in which information is divided and divided pieces of information are converted into a plurality of pieces of code information and displayed on a display unit, and the like, are also known as stated in Japanese Laid-open Patent Publication No. 2003-317051 and Japanese Laid-open Patent Publication No. 2007-215120.

Here, the code information is provided as a picture printed on the surface of a certain object, or as a picture displayed on a certain display apparatus. An electronic device equipped with a imaging function, for example a mobile phone, a smartphone or the like, takes the picture of the code information using the imaging function to obtain information related to a communication operation or the like from the obtained picture of the code information, and executes a prescribed operation.

SUMMARY

According to an electronic device according to an aspect of the present invention, an electronic device which is capable of displaying a plurality of pieces of information which may be obtained by an imaging operation includes
a communication unit which performs wireless communication with an information terminal, a generating unit which generates code information, a display unit which performs display while changing between a first display format in which the generating unit is made to generate a single piece of code information to be displayed including the plurality of pieces of information and a second display format in which the generating unit is made to generate a plurality of pieces of code information individually including the plurality of pieces of information and pictures of the code information are displayed sequentially one by one, and a control unit which makes the display unit display the first display format, and which performs a display of the second display format on the display unit when it is impossible to establish the wireless communication with the information terminal by the communication unit within a first prescribed time after displaying the first display format.

Meanwhile, according to a control method for an electronic device according to another aspect of the present invention, a control method for an electronic device which includes a display unit, a communication unit which performs wireless communication with an information terminal, a generating unit which generates code information and a control unit, and which is capable of displaying a plurality of pieces of information which may be obtained by an imaging operation, wherein the control unit changes between a first display format in which the generating unit is made to generate a single piece of code information to be displayed including the plurality of pieces of information and a second display format in which the generating unit is made to generate a plurality of pieces of code information individually including the plurality of pieces of information and pictures of the generated code information are sequentially displayed one by one, and controls the display unit to display the first display format, and performs a display of the second display format on the display unit when it is impossible to establish the wireless communication with the information terminal by the communication unit within a first prescribed time after displaying the first display format.

Meanwhile, according to a recording medium according to another aspect of the present invention, a recording medium recording a control program for causing a microcomputer of an electronic device to execute a process, which is a control program for causing the microcomputer of an electronic device which includes a display unit, a communication unit which performs wireless communication with an information terminal, a generating unit which generates code information and a control unit, and which is capable of displaying a plurality of pieces of information which may be obtained by an imaging operation, wherein the microcomputer changes between in a first display format in which the generating unit is made to generate a single piece of code information to be displayed including the plurality of pieces of information and a second display format in which the generating unit is made to generate a plurality of pieces of code information individually including the plurality of pieces of information and pictures of the generated code information are sequentially displayed one by one on the display unit, and controls the display unit to display the first display format, and performs a display of the second display format on the display unit when it is impossible to establish the wireless communication unit within a first prescribed time after displaying the first display format.

BRIEF DESCRIPTION OF DRAWINGS

The present invention will be more apparent from the following detailed description when the accompanying drawings are referenced.

DESCRIPTION OF EMBODIMENTS

Hereinafter, embodiments of the present invention are explained in detail with reference to the drawings.

Figure 1:
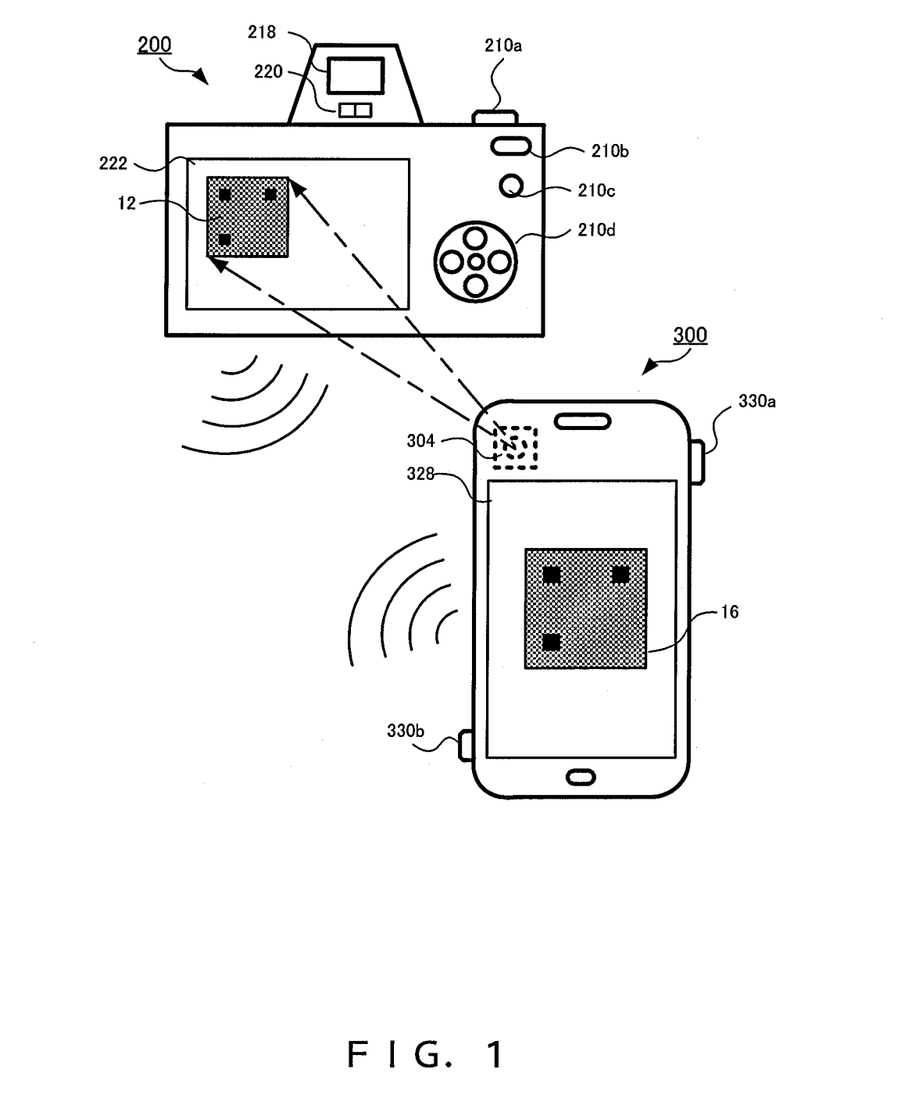
FIG. 1 illustrates a configuration at a time when an information terminal and a photographing apparatus perform communication.

FIG. 1 illustrates a configuration at a time when an information terminal which is an external device and a photographing apparatus which is an electronic device according to the present embodiment perform communication.

A photographing apparatus (DSC, Digital Still Camera) 200 illustrated in FIG. 1 presents the external appearance of its rear side (the face that faces a user who operates the photographing apparatus), and an information terminal 300 presents the external appearance of its front side. The information terminal 300 is a device represented by a multifunction mobile phone (smartphone). The front side of the information terminal 300 is a face on which a display member and a touch panel are placed. The photographing apparatus 200 is equipped with a rear-side display unit 222 as a first observation means and a viewfinder 218 as a second observation means. The user is able to check the subject image using either one of the observation means. An eyepiece detecting unit 220 is a means that detects which observation means the user is using. The photographing apparatus 200 controls operations of the viewfinder 218 and the rear-side display unit 222 according to a detection result of the detection unit. The photographing apparatus 200 is equipped with a release SW 210a, a power SW 210b, a wireless mode setting/canceling SW 210c, a cross SW 210d and the like as operation SWs (switches). In addition, the rear-side display unit 222 is equipped with a touch panel, and the user is able to operate the photographing apparatus 200 by touching a member (a virtual operation SW) displayed on the screen. The information terminal 300 is equipped with a terminal display unit 328, an imaging unit 304, and a photographing instruction SW 330a, a power SW 330b and the like as operation SWs.

The photographing apparatus 200 and the information terminal 300 are each equipped with a WLAN (wireless LAN, Wireless Local Area Network) communication circuit. The communication circuit performs communication operations in a system that is compliant with the IEEE803.11 standard, for example. It does not have to be limited to this standard, and a system that is compliant with the IrDA standard, the Bluetooth (registered trademark) standard, the IrSimple standard or the like may be used as the wireless communication system.

The user operates the wireless mode setting/canceling SW 210c to select (set) the wireless mode as the operation mode of the photographing apparatus 200. Then, a picture of code information 12 including information related to communication parameters is displayed on the rear-side display unit 222 of the photographing apparatus 200. In an example, a picture of a two-dimensional barcode is used as the code information, but the code information may be either a one-dimensional barcode or a two-dimensional barcode. As a two-dimensional barcode, the QR code (registered trademark) may be used, for example. A two-dimensional code (PDF417, Maxi Code, Veri Code, or the like) other than the QR code may also be used. Meanwhile, the user of the information terminal 300 launches prescribed application software to perform a communication operation by the wireless LAN. Whether the user of the information terminal 300 is the same as or different from the user of the photographing apparatus 200 is not a problem. Therefore, hereinafter, the users are not distinguished in the explanation. It is assumed that a program required for operation of the application software (hereinafter, referred to as software for short) is downloaded and installed in the information terminal from a web server by the user in advance.

After launching the software in the information terminal 300, the user operates the photographing instruction SW 330a to take a picture of information 11 (communication setting information) displayed on the photographing apparatus 200. During this photographing operation, an image 16 obtained by taking the picture of the code information 12 is displayed on the display unit 328. The information terminal 300 decodes the code information of the photographed picture (picture 16), to obtain information such as communication parameters and the like. With necessary information such as the communication parameters and the like having been set in both the information terminal 300 and the photographing apparatus 200, a wireless LAN communication line is established.

Meanwhile, when operating the information terminal 300 to taking a picture of the code information 12 on the rear-side display unit 222, the user brings the imaging unit 304 of the information terminal 300 close to the vicinity of the rear-side display unit 222. When the eyepiece detecting unit 220 is operating at this time, the body of the information terminal 300 enters (interferes with) the detection area of the eyepiece detecting unit 220. Then, the photographing apparatus 200 determines that the user is using the viewfinder, and the photographing apparatus 200 prohibits the operation (turns off the display) of the rear-side display unit 222. In such a situation, it is impossible to establish (connect) a wireless LAN communication line. Therefore, in the wireless mode, the photographing apparatus 200 stops (prohibits) the detection operation of the eyepiece detecting unit 220 to maintain the display of the code information 12 on the rear-side display unit 222. This operation is a known technique and a detailed explanation is omitted here.

Next, the configuration of the photographing apparatus 200 and the information terminal 300, and operations of the respective apparatuses in a case in which the photographing apparatus 200 operates as an access point (wireless LAN access point) of the wireless LAN, are explained with reference to the drawing.

Figure 2:
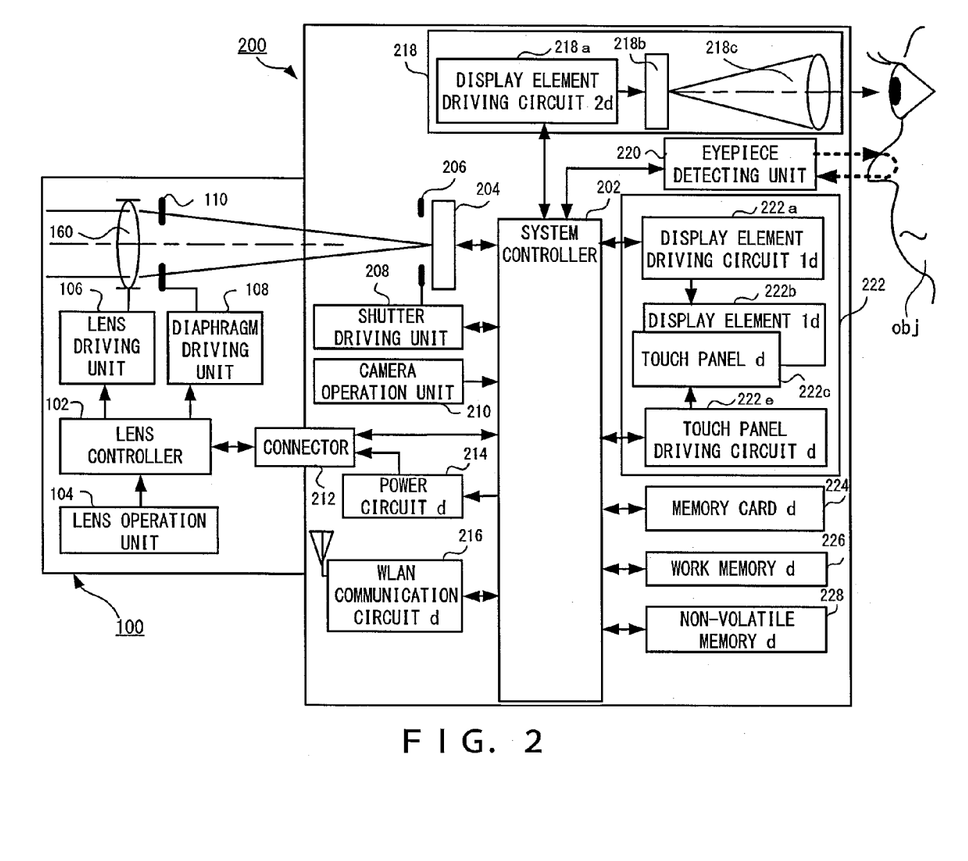
FIG. 2 illustrates a block configuration diagram of a photographing apparatus and an interchangeable lens attached to and removed from the photographing apparatus.

FIG. 2 illustrates a block configuration diagram of the photographing apparatus 200 and an interchangeable lens 100 attached to and removed from the photographing apparatus 200.

The photographing apparatus 200 illustrated in FIG. 2 may be configured to be integrated with the interchangeable lens 100. The photographing apparatus 200 (camera main body) is equipped with a system controller 202, an image pickup device 204, a shutter 206, a shutter driving unit 208, a camera operation unit 210, a connector 212, a power circuit d214, a WLAN (Wireless Local Area Network) communication circuit d216, an EEPROM (Electrically Erasable Programmable Read-Only Memory) 230, a viewfinder 218, an eyepiece detecting unit 220, a rear-side display unit 222, a memory card d224, a work memory d226 and a non-volatile memory d228 as constituent elements. In order to prevent the names of the constituent elements of the photographing apparatus 200 from becoming the same as the names of the constituent elements of the information terminal 300 (see FIG. 3), "d" is added to some of the constituent elements. The interchangeable lens 100 is equipped with a lens controller 102, a lens operation unit 104, a lens driving unit 106, a diaphragm driving unit 108, a diaphragm 110 and a taking lens 160 as constituent elements.

The system controller 202 is a control unit which controls the photographing apparatus 200 and the interchangeable lens 100 in an integrated manner. The camera operation unit 210 is configured by a release SW 210a, a power SW 210b, a wireless mode setting/canceling SW 210c, a cross SW 210d and the like. In response to operation of these SWs (switches) by the user, the system controller 202 executes prescribed operations. The luminous flux of the taking lens 160 forms a subject image on the imaging surface of the image pickup device 204. The image pickup device 204 converts the subject image (optical image) to an electric signal (image data) and outputs this to the system controller 202. An opening/closing operation of the shutter 206 is performed by the shutter driving unit 208. Driving of the diaphragm 110 is performed by the diaphragm driving unit 108. The lens controller 102 communicates with the system controller 202 via the connector 212 and controls the diaphragm 110 according to an instruction from the system controller 202. The system controller 202 controls the amount of exposure to the image pickup device 204 by controlling the shutter 206 and the diaphragm 110 according to the brightness of a subject. The system controller 202 calculates a contrast value of the subject from the electric signal output from the image pickup device 204, and the system controller 202 instructs the lens controller 102 to drive the taking lens 160 according to the contrast value. The lens controller 102 controls the lens driving unit 106 according to this instruction. The lens operation unit 104 is operated by the user when manually driving the taking lens 160. The power circuit d214 supplies power of a battery (not shown in the drawing) in the photographing apparatus 200 to circuits and actuators in the photographing apparatus 200 and to circuits and actuators in the interchangeable lens 100. And, in the present embodiment, the system controller 202 generates a single piece or a plurality of pieces of code information including information that is necessary when establishing a communication line with the information terminal 300, according to an instruction from the user or the like.

The WLAN communication circuit d216 is a circuit for performing communication with the information terminal 300. An EEPROM 230 (non-volatile memory) that stores communication parameters is connected to the WLAN communication circuit d216. The communication parameters are information that is necessary when establishing a communication line between the photographing apparatus 200 and the information terminal 300 by means of the wireless LAN. As a communication parameter, for example, a MAC address (Media Access Control address) is stored in the EEPROM 230. Hereinafter, information such as the communication parameters exchanged when establishing a communication line between the photographing apparatus 200 and the information terminal 300 is also referred to as "communication setting information".

The viewfinder 218 is an EVF (Electronic View Finder) through which the subject image may be observed electrically. While the viewfinder 218 illustrated in FIG. 2 is embedded inside the photographing apparatus 200, it may also be configured to be detachable. The viewfinder 218 is equipped with a display element driving circuit 2d218a, an EVF display element 218b and an eyepiece 218c. When the system controller 202 permits operation of the viewfinder 218 (an observation operation is permitted), the system controller 202 obtains image data from the image pickup device 204 at a prescribed frame rate, and transmits this to the display element driving circuit 2d218a. The display element driving circuit 2d218a displays a live view on the EVF display element 218b according to the image data. The user is able to observe the display using the eyepiece 218c. When the system controller 202 prohibits operation of the viewfinder 218 (an observation operation is prohibited), the system controller 202 prevents display on the EVF display element 218b from being performed. Methods for this include stopping operation of the display element driving circuit 2d218a or the EVF display element 218b, stopping transmission of image data to the display element driving circuit 2d218, and when the EVF display element 218b is a display element equipped with a backlight, turning off the backlight, and the like. Any method may be selected as long as the method may set up a state in which power consumed in the viewfinder 218 decreases and it is impossible to observe the subject.

The rear-side display unit 222 is placed on the surface of the rear side of the body of the photographing apparatus 200, and its display may be observed without using any optical system (eyepiece). The rear-side display unit 222 is equipped with a display element driving circuit 1d222a, a display element 1d222b, a touch panel d222c and a touch panel driving circuit d222e. When the system controller 202 permits operation of the rear-side display unit 222 (an observation operation is permitted), the system controller 202 obtains image data from the image pickup device 204 at a prescribed frame rate, and transmits this to the display element driving circuit 1d222a. The display element driving circuit 1d222a displays a live view on the display element 1d222b according to the image data. The user is able to observe the subject image according to this display operation. When the system controller 202 prohibits operation of the rear-side display unit 222 (an observation operation is prohibited), the system controller 202 prevents display on the display element 1d222b from being performed. Methods for this include stopping operation of the display element driving circuit 1d222a or the display element 1d222b, stopping transmission of image data to the display element driving circuit 1d222a, and when the display element 1d222b is a display element equipped with a backlight, turning off the backlight, and the like. That is, any method may be selected as long as the method may set up a state in which power consumed in the rear-side display unit 222 decreases and it is impossible to observe the subject picture.

The touch panel d222c is placed on the display element 1d222b, and when the touch panel d222c is touched by a finger, a stylus pen or the like, the touch panel driving circuit d222e detects the touch position.

The system controller 202 determines whether or not the user is using the viewfinder 218 according to the output of the eyepiece detecting unit 220 (exactly speaking, the eyepiece detecting unit 220 does not detect the user, but simply detects an object obj). When the system controller 202 judges that the user is using the viewfinder 218, the system controller 202 permits operation of the viewfinder 218 and prohibits operation of the rear-side display unit 222. When the system controller 202 judges that the user is not using the viewfinder 218, the system controller 202 prohibits operation of the viewfinder 218 and permits operation of the rear-side display unit 222. Operations of the rear-side display unit 222 are described later.

The memory card d224 stores files of video pictures or files of still pictures and the like, generated from image data photographed by the photographing apparatus 200, in a prescribed format. The work memory d226 is used as a storage area to temporarily store data. For example, the storage area is used in an image processing operation. The non-volatile memory d228 stores program code executed by the system controller 202, control parameters and the like. A parameter that decides the detection sensitivity (detection distance) of the eyepiece detecting unit 220 is included in the control parameters. Also, some of the communication parameters are stored as control parameters. These include, for example, an SSID (Service Set Identification) and a cryptographic KEY.

Figure 3:
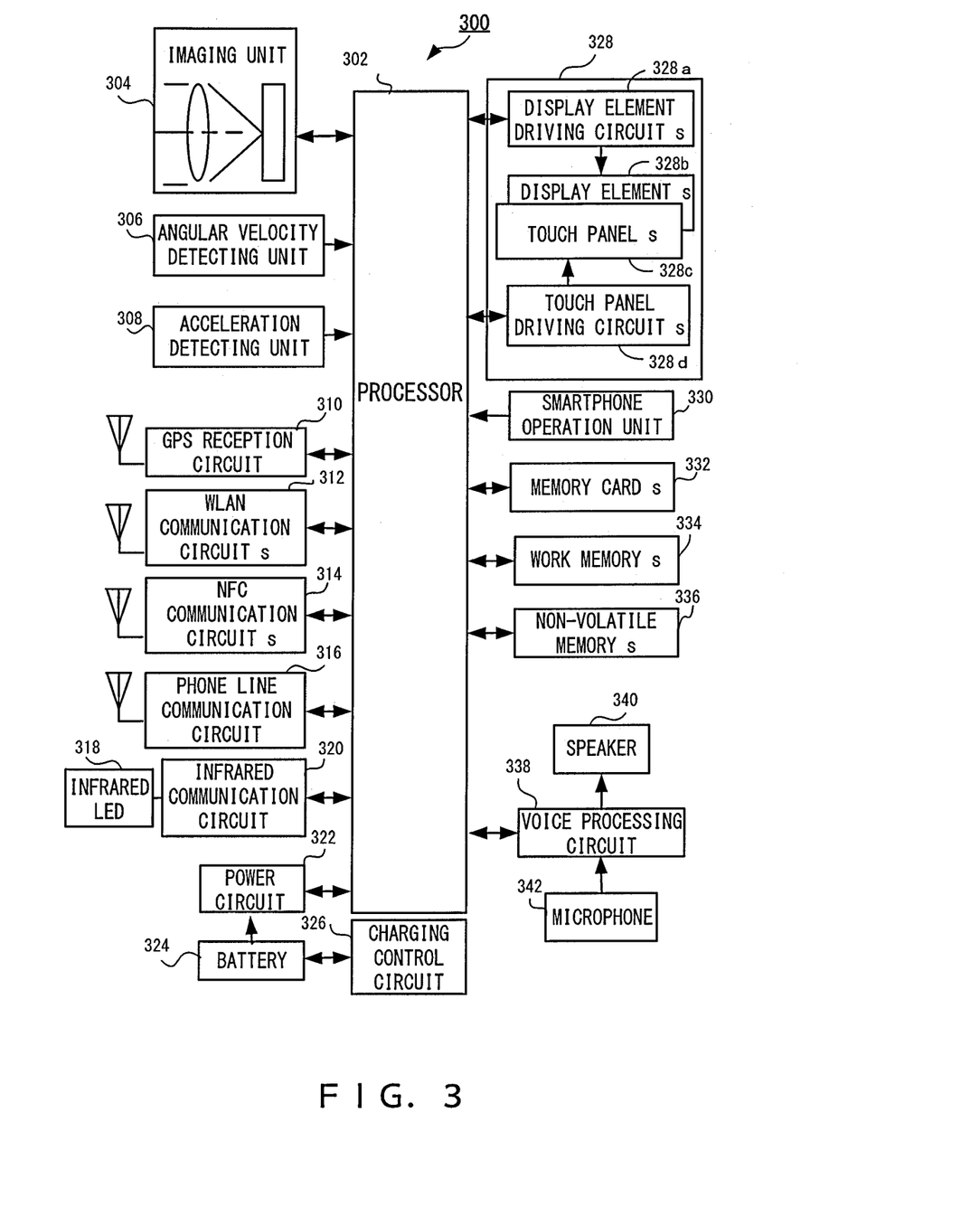
FIG. 3 illustrates a block diagram of an information terminal.

FIG. 3 illustrates a block configuration diagram of the information terminal 300.

The information terminal 300 may be for example, a multifunction mobile phone that is equipped with an Internet connection function, a homepage browsing function, an e-mail transmission/reception function, an execution function for various application software, and the like, in addition to functions as a mobile phone.

The information terminal 300 is equipped with a processor 302, a imaging unit 304, an angular velocity detecting unit 306, an acceleration detecting unit 308, a GPS (Global Positioning System) reception circuit 310, a WLAN communication circuit s312, an NFC (Near Field Communication) communication circuit 314, a phone line communication circuit 316, an infrared LED 318, an infrared communication circuit 320, a power circuit s322, a battery 324, a charging control circuit 326, a display unit 328, a smartphone operation unit 330, a memory card s332, a work memory s334, a non-volatile memory s336, a voice processing circuit 338, a speaker 340 and a microphone 342 as constituent elements. In order to prevent the names of the constituent elements of the information terminal 300 from becoming the same as the names of the constituent elements of the photographing apparatus 200 (see FIG. 2), "s" is added to some of the constituent elements.

The processor 302 is a control unit which controls the information terminal 300 in an integrated manner. The imaging unit 304 is configured by an optical system and an image sensor, and the imaging unit 304 outputs a subject image as image data. In addition, communication setting information exchanged when performing wireless communication with the photographing apparatus 200 is captured as image data (a picture of code information) from the imaging unit 304. The processor 302 obtains the communication setting information (communication parameters, control parameters) by performing a decoding process on the image data.

The processor 302 is able to obtain posture information of the information terminal 300 and information of applied impact from the output of the angular velocity detecting unit 306 and the acceleration detecting unit 308. The processor 302 obtains position information of the information terminal 300 on the earth from the output of the GPS reception circuit 310.

The processor 302 is able to perform wireless communication with the system controller 202 of the photographing apparatus 200 via the WLAN communication circuit s312. In addition, it is also used when connecting to the Internet via an access point of the wireless LAN.

The NFC communication circuit 314 may be used when making the information terminal 300 function as a prepaid card or a cash card. The phone line communication circuit 316 is a circuit that makes the information terminal 300 function as a mobile phone. The infrared LED 318 and the infrared communication circuit 320 are used when communicating with another information terminal that exists in the vicinity of the information terminal 300.

The output of the battery 324 embedded in the information terminal 300 is converted to a desired voltage by the power circuit s322, and this is supplied to the circuit block in the information terminal 300. The charging control circuit 326 controls power supplied from outside the information terminal 300 to charge the battery 324.

The display unit 328 is equipped with a display element driving circuit s328a, a display element s328b, a touch panel s328c and a touch panel driving circuit s328d. When an operation for wireless connection to the photographing apparatus 200 is performed, communication setting information obtained from the imaging unit 304 is displayed on the terminal display unit 328. When software for performing remote control of the photographing apparatus 200 is launched, the display unit 328 is used as a GUI (Graphical User Interface) for operating the photographing apparatus. The user is able to perform remote control of the photographing apparatus 200 by touching a member (virtual operation switch) displayed on the screen. The smartphone operation unit 330 is equipped with a photographing instruction SW 330a, a power SW 330b and the like. The user operates the photographing instruction SW 330a when making the information terminal 300 function as a photographing apparatus to obtain image data.

The memory card s332 stores information related to a phonebook, image data and e-mail, and content downloaded from the Internet, and the like. The work memory s334 is used as an area for executing software stored in a non-volatile memory s336, a temporary storage area for data necessary for data processing operations (image processing, voice processing, and so forth), and the like.

The voice processing circuit 338, the speaker 340 and the microphone 342 are used when making the information terminal 300 function as a mobile phone. A voice signal received from the phone line communication circuit 316 goes through a decoding process in the voice processing circuit. 338 and is output as a voice from the speaker 340. The voice of the user is input from the microphone 342, encoded in the voice processing circuit 338 and transmitted from the phone line communication circuit 316.

As described above, when establishing a wireless line between information terminal 300 and the photographing apparatus 200, the information terminal 300 obtains communication setting information from the photographing apparatus 200 such as communication parameters held by the photographing apparatus 200, and it is necessary to set this information as communication parameters in the information terminal 300 as well. In the present embodiment, the system controller 202 of the photographing apparatus 200 generates code information such as a QR code or the like including the communication setting information, and a picture of the code information which is its image is displayed on the rear-side display unit 222. The information terminal 300 takes the picture of the code information displayed on the rear-side display unit 222 of the photographing apparatus 200 to perform a setting operation for communication parameters and the like.

Here, in a case such as when the amount of communication setting information is large, in order to express it with one code, a higher display resolution is required for the rear-side display unit 222 in the photographing apparatus 200 that displays the code information. In addition, a higher imaging performance is required in the information terminal 300 that obtains the code information. However, the photographing apparatus 200 and the information terminal 300 are not always provided with such performance. Therefore, in the present embodiment, in a case such as when the information terminal 300 is unable to appropriately obtain communication setting information from a picture of a single piece of code information including all the communication setting information, the system controller 202 of the photographing apparatus 200 generates code information for each piece of communication setting information (parameter) and displays pictures of the code information sequentially one by one on the rear-side display unit 222. This is explained in detail below.

Figure 4A:
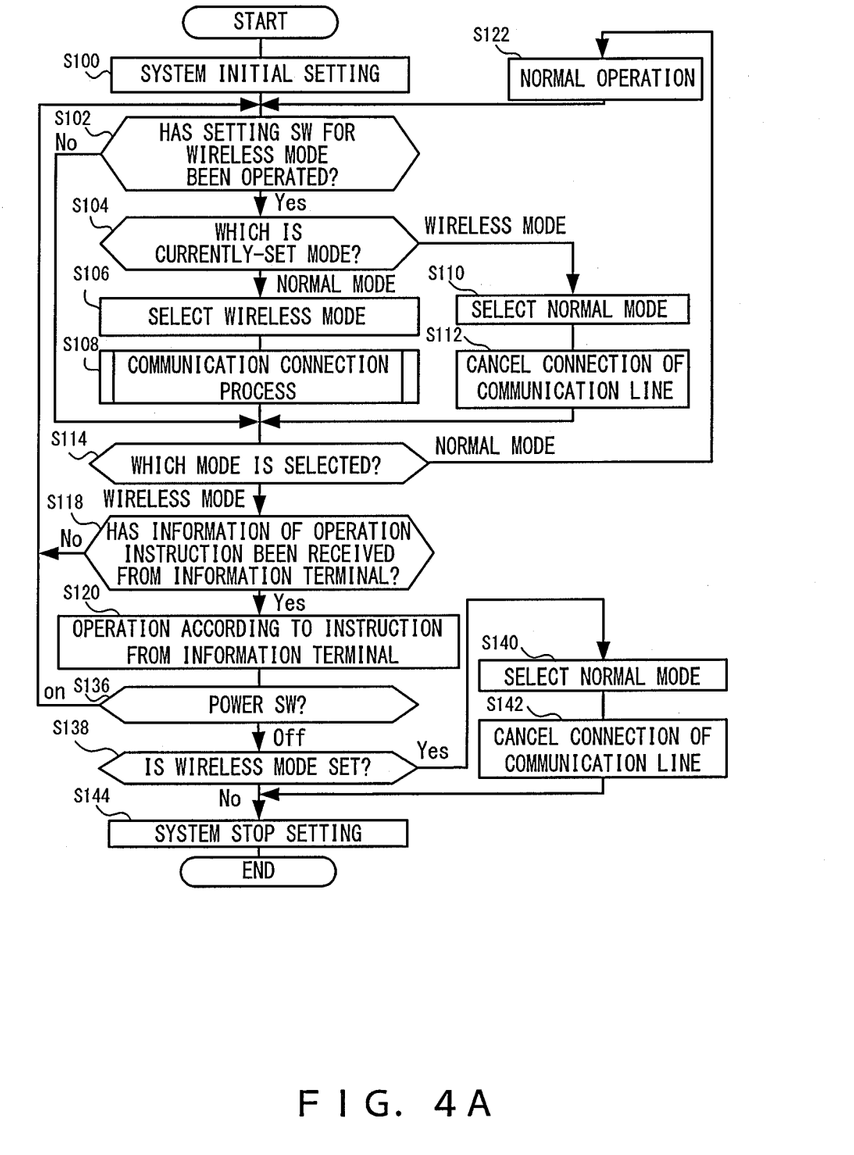
FIG. 4A is a flowchart illustrating the main routine of operations performed by a photographing apparatus according to an embodiment.

FIG. 4A is a flowchart illustrating the main routine of operations by the photographing apparatus 200 according to the present embodiment. When the power of the photographing apparatus 200 is switched to ON, the system controller 202 of the photographing apparatus 200 reads the program code stored in the non-volatile memory d228, and the system controller 202 executes a series of processes illustrated in FIG. 4A according to the program code.

First, in step S100 in FIG. 4A, the system controller 202 performs initial setting of the system.

In step S102, the system controller 202 judges whether or not a setting switch for the wireless mode has been operated. The judgment in step S102 is made according to whether or not the wireless mode setting/canceling switch 210c in FIG. 1 has been pressed, for example. Alternatively, the judgment may be made according to the operation of a prescribed operation member such as a switch, a button, a dial, a touch panel or the like provided in the photographing apparatus 200. Alternatively, the configuration may be made to use mode setting, without using any operation member. For example, the judgment may be made according to whether or not a signal related to the mode setting has been received via NFC communication or the like from the information terminal 300 or the like.

In step S102, when pressing of the wireless mode setting/canceling switch 210c or the like is recognized (step S102, Yes), the process proceeds to step S104. When a pressing operation of the switch or the like is not recognized (step S102, No), the process is shifted to step S114.

In step S104, the system controller 202 judges the currently-set mode. There are two patterns of modes, namely a normal mode in which operations such as imaging and the like are performed by operation of the operation members (the lens operation unit 104, the camera operation unit 210) provided in the photographing apparatus 200, and a wireless mode in which operations specified using a remote control signal from the information terminal 300 in a wireless manner are performed. When the currently-set operation mode is the normal mode, the process proceeds to step S106, and when the currently-set operation mode is the wireless mode, the process proceed to step S110.

In step S106, the system controller 202 selects the wireless mode as the mode to be set, and in step S108, a connection process for connecting a communication line to the information terminal 300 is executed. Details of the communication line connection process are explained later with reference to FIG. 4B.

On the other hand, in step S110, the system controller 202 selects the normal mode as the mode to be set, and in step S112, a process to cancel connection of the communication line to the information terminal 300 is executed. The process to cancel connection of the communication line uses a known technique.

When the connection process is performed in step S108 or the connection canceling process is performed in step S112, the process is shifted to step S114. As described above, in the communication line connection process in the wireless mode in step S108, the system controller 202 executes a process such as a code information generation process according to the setting situation of the communication setting information terminal 300, or the like. This is explained in detail later with reference to FIG. 4B and FIG. 5A, FIG. 5B.

In step S114, the system controller 202 judges the selected mode. When the normal mode is selected, the process proceeds to step S122 and normal operation is executed, after which the process returns to step S102. The normal mode operation in step S122 uses a known technique. On the other hand, when the wireless mode is selected, the process is shifted to step S118.

In step S118, the system controller 202 judges whether or not information representing an instruction for executing a prescribed operation has been received from the information terminal 300 via the wireless LAN. When such information has not been received from the information terminal 300 (step S118, No), the process returns to step S102. When information representing an instruction for executing a prescribed operation has been received from the information terminal 300 (step S118, Yes), the process is shifted to step S120.

In step S120, the system controller 202 executes the operation for which an instruction has been received from the information terminal 300, and the process is shifted to step S136.

In step S136, the system controller 202 judges the state of the power switch of the photographing apparatus 200. When the power switch is in the ON state, the process returns to step S102. When switching of the power switch to the OFF state is recognized, the process proceeds to step S138.

In step S138, the system controller 202 judges whether the mode set in the photographing apparatus 200 is still the wireless mode. When it is the wireless mode (step S138, Yes), the process proceeds to step S140, and the system controller 202 selects the normal mode. Then, in step S142 a process to cancel connection of the communication line is executed, and the process proceeds to step S144. When the normal mode is set in step S138 (step S138, No), the process is shifted to step S144 without performing any particular process.

In step S144, the system controller 202 executes various processes to stop the system, and the process is terminated after executing a prescribed process such as to store a set parameter value, or the like.

Figure 4B:
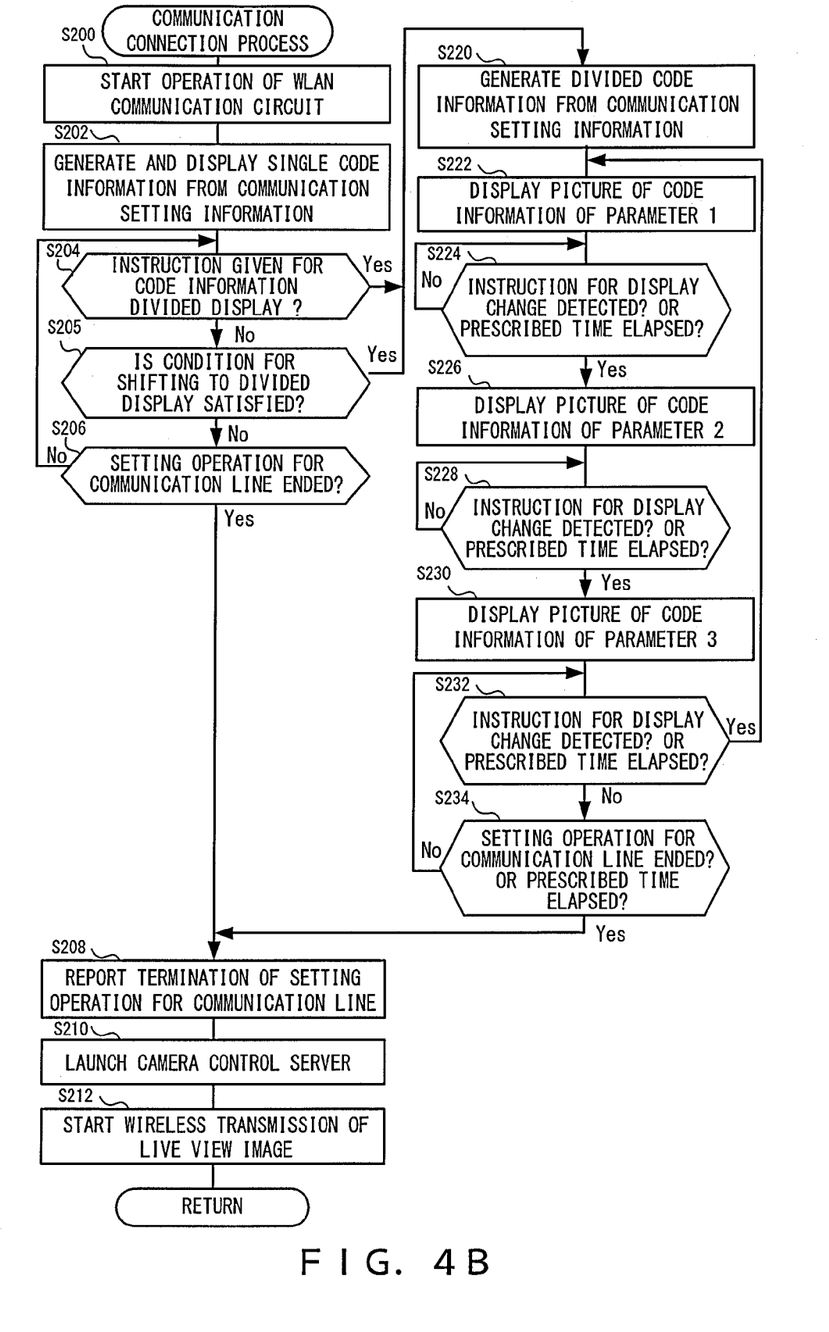
FIG. 4B is a flowchart illustrating a communication connection process (subroutine) performed by a photographing apparatus.

FIG. 4B is a flowchart illustrating a communication connection process (subroutine) of the photographing apparatus 200, and illustrates the detailed flow of step S108 in FIG. 4A.

In the communication connection process, first, the system controller 202 starts operation of the WLAN communication circuit 216d in step S200. Then, in step S202, the system controller 202 generates one piece of code information from communication setting information such as communication parameters and the like and the system controller 202 displays this on the rear-side display unit 222.

Figure 5A:
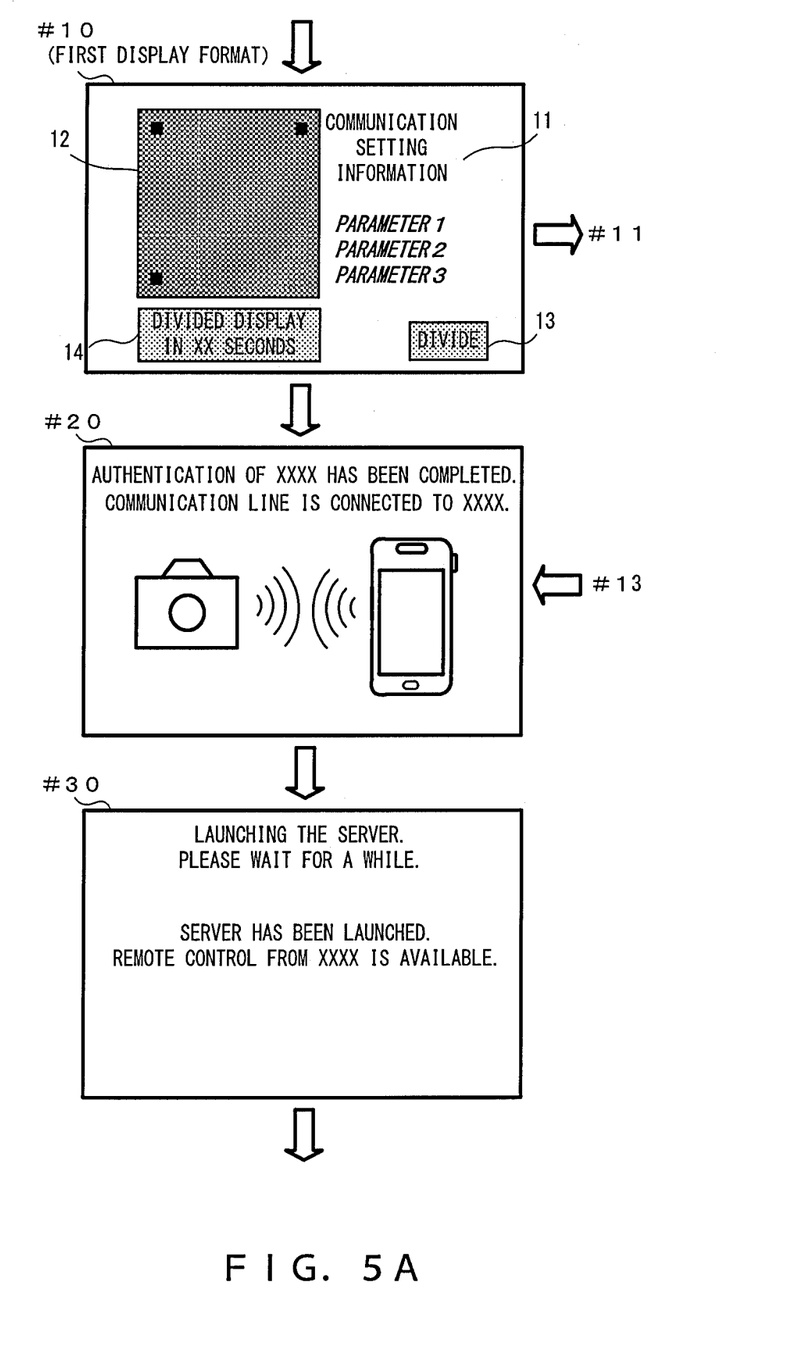
FIG. 5A is a diagram (1) illustrating an example of a screen displayed on a rear-side display unit of a photographing apparatus in a communication connection process.
Figure 5B:
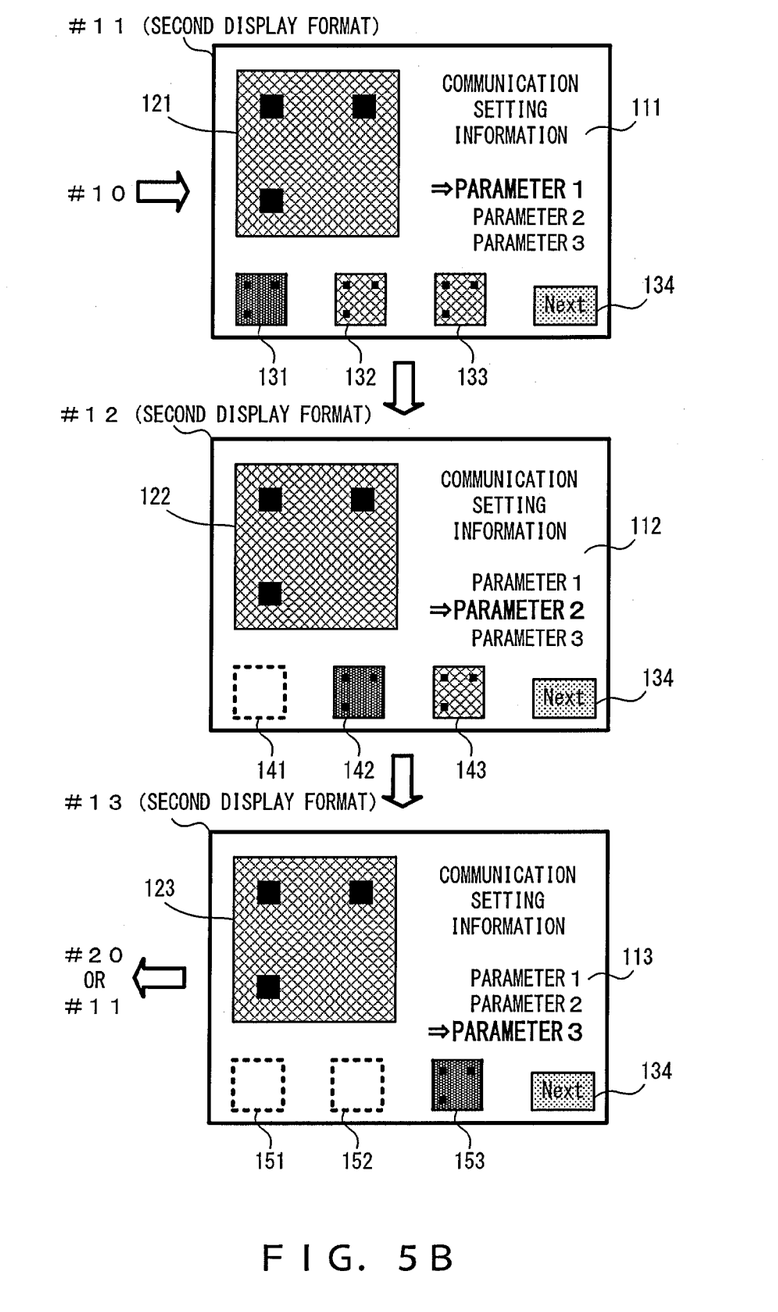
FIG. 5B is a diagram (2) illustrating an example of a screen displayed on a rear-side display unit of a photographing apparatus in a communication connection process.

FIG. 5A and FIG. 5B are diagrams illustrating examples of screens displayed on the rear-side display unit 222 of the photographing apparatus 200 in the communication connection process in FIG. 4B. Among these, screen #10 in FIG. 5A is an example of a screen displayed on the rear-side display unit 222 in step S202.

Screen #10 in FIG. 5A displays a picture of code information 12 that includes three parameters 1 through 3 displayed on a communication setting information list 11. As an example of the parameters, for example, parameter 1 may be an SSID (Service Set Identifier) of the wireless LAN, parameter 2 may be the WEP key (Wired Equivalent Privacy Key) of the wireless LAN, and parameter 3 may be the model code of the photographing apparatus 200 or program version information, or the like.

In step S204, the system controller 202 judges whether or not an instruction has been given from the user to divide the code information for display. When a division instruction for the code information from the user is not detected (step S204, No), the process is shifted to step S205. On the other hand, when a division instruction for the code information from the user is detected (step S204, Yes), the process is shifted to step S220. With screen #10 in FIG. 5A, the judgment in S204 is made according to whether or not pressing of a code information division icon 13 or the display area of the picture of the code information 12 has been recognized. Alternatively, the judgment in step S204 may be made according to operation of an operation SW provided on the main body of the photographing apparatus 200.

In step S205, the system controller 202 judges whether or not a condition for shifting the display state of the code information is satisfied. A display format in which a single piece of code information is displayed as in screen #10 illustrated in FIG. 5A is assumed as a "first display format". A display format in which code information generated in step S202 is divided to generate a plurality of pieces of code information and the pieces of code information are displayed sequentially one by one is assumed as a "second display format". Details of the second display format are described later.

In screen #10 in FIG. 5A, an area 14 for a countdown display of the time before shifting the display format of the code information is provided. In an example, the system controller 202 measures the duration of continuation of the first display format by means of a timer that is not illustrated in FIG. 2. Then, when a prescribed time elapses and the remaining time to the divided display of the code information presented in the area 14 becomes 0 seconds and the countdown on screen #10 ends, an automatic shift to the second display format is performed.

Meanwhile, a case in which it is judged in S205 that a condition for shifting to divided display is satisfied may be when it is impossible to obtain some parameters, or when it is impossible to establish communication due to an inappropriate value of a parameter, or the like, in addition to the case in which a prescribed time has elapsed, as described above.

In the explanation of the flowchart in FIG. 4B below, first, the process is explained for a case in which it is possible for the information terminal 300 to obtain all of parameters 1 through 3 from a single picture of code information 12 on screen #10 of the photographing apparatus 200, and it is unnecessary to divide the code information.

In step S206, the system controller 202 judges whether or not the setting operation for the wireless LAN communication line has ended. When the setting operation for the wireless LAN communication line has not ended in step S206, the process returns to step S204. When a process for obtaining and registering device information in the information terminal 300 is completed, the process is shifted from step S206 to step S208.

In step S208, the system controller 202 reports the termination of the setting operation for the wireless LAN communication line to the user. Screen #20 in FIG. 5A is an example of a screen for reporting the termination of the setting operation for the communication line in step S208.

In step S210, the system controller 202 launches a control server of the photographing apparatus 200. Screen #30 in FIG. 5A is an example of a screen for notifying the user of the launch of the control server in step S210. Then, in step S212, a process such as wireless transmission of a live view image to the information terminal 300 is started, and the process is terminated.

Meanwhile, depending on the display resolution of the photographing apparatus 200 and the imaging performance of the information terminal 300, it may be impossible for the information terminal 300 to obtain all the necessary parameters from a single piece of code information. In such a case, upon receiving an instruction from the user in step S204, or upon satisfaction of the condition in step S205, the process is shifted to step S220, and processes in and after step S220 are performed.

In step S220, the system controller 202 generates a plurality of pieces of code information including the respective parameters of communication setting information as information, and stores these in the non-volatile memory d228 or the like.

In the embodiment, when dividing the code information generated in step S202 to generate a plurality of pieces of code information, from the standpoint of ease of processing at the information terminal 300, the number of divisions is made to match the number of parameters. This is because the information terminal 300 is thus able to obtain information in units of individual parameters.

In step S222, the system controller 202 first displays a picture of the code information that includes information of a first parameter among a plurality of parameters to be set, on the rear-side display unit 222.

Screens #11 through #13 in FIG. 5B are screen examples in the case of the second display format, and among these, screen #11 is an example of a screen after the display format of the code information is switched from the first display format to the second display format.

On screen #11, a picture 121 of code information of "parameter 1" which is the first parameter is displayed. At this time, in order to improve convenience for the user, icons 131 through 133 of pictures of a plurality of pieces of code information to be read by the information terminal 300 are also displayed on the screen of the rear-side display unit 222. As an icon, a reduced image or a thumbnail is displayed. As illustrated as an example on screen #11, the icon 131 corresponding to the picture 121 of code information that is being displayed for reading by means of a picture of code information may be displayed in a display format in which it may be distinguished from other icons, by changing its color and/or the size with respect to the other icons 132 and 133 or by making it blink, for example. In this way, visibility for the user is improved.

Meanwhile, on screen #11, a list display 111 of all the parameters is provided. Among them, there may be applied to the parameter' item that corresponds to the picture 121 of code information, with respect to the other parameters, a process such as highlighted display, reverse display, change of color, change of font, change of size, blinking, attachment of a parameter index, or the like. By providing a display format in which this parameter may be distinguished from the other parameters, visibility for the user is improved.

Returning to the explanation of FIG. 4B, in step S224, the system controller 202 judges whether or not an instruction from the user for changing the picture of code information to be displayed has been detected, or a prescribed time has elapsed since display of the picture of code information of the first parameter started.

An instruction for changing the picture of code information is detected according to the pressing of an icon 134 on screen #11 in FIG. 5B, or the like. When an instruction for changing the picture of code information has not been detected, and a prescribed time has not elapsed, in step S224 (step S224, No), waiting for the instruction or the elapse of the prescribed time is performed. When an instruction from the user is detected or the prescribed time has elapsed (step S224, Yes), the process proceeds to step S226. By changing the picture of code information to be displayed on the rear-side display unit 222 according to the detection of an instruction from the user or the elapse of a prescribed time, it becomes possible for the information terminal 300 to smoothly obtain the parameters.

In step S226, the system controller 202 displays a picture of code information that includes information of a second parameter on the rear-side display unit 222.

On screen #12 in FIG. 5B, a picture 122 of code information of "parameter 2" which is the second parameter is displayed. In the same manner as on screen #11, icons 141 through 143 of the respective parameters are displayed on screen #12 as well. However, on screen #12, the icon 141 of parameter 1 is displayed as an outline or the like to indicate that display of parameter 1 which is the first parameter has ended, displaying it in a display format that is different from those for the icon 142 corresponding to the picture 122 of code information being displayed in step S226 and for the icon 143 of the picture of code information to be displayed later'. On screen #12 in FIG. 5B, the icon 141 is indicated by a broken line, but not to display it at all on the screen is also one of the display formats of the icon 141.

In the same manner as on screen #11, the parameter item that corresponds to the picture 122 of code information being displayed is displayed in a display format in which it may be distinguished from other parameters on screen #12 as well.

The judgment in step S228 in FIG. 4B is the same as in step S224. That is, when an instruction for changing the picture of code information to be displayed is detected via the icon 134 on screen #12 or a prescribed time has elapsed, the process proceeds from step S228 to step S230.

In step S230, the system controller 202 displays a picture of code information that includes information of a third parameter on the rear-side display unit 222.

On screen #13 in FIG. 5B, a picture 123 of code information of "parameter 3" which is the third parameter is displayed. The display methods for icons 151 through 153 are the same as in the case of screen #12, and the icons 151 and 152 for which display has ended are displayed in a format such as outline display or the like, and on screen #13, only the icon 153 of parameter 3 being displayed is displayed as a reduced picture, a thumbnail or the like. In addition, in the same manner as in screens #11 and #12, a list display 113 of the parameters is provided, and among them, the parameter item corresponding to the picture 123 of code information is displayed in a display format in which it may be distinguished from other parameters.

The judgment in step S232 in FIG. 4B is the same as in step S224 and step S228. When the system controller 202 detects an instruction for changing the picture of code information to be displayed via the icon 134 on screen #13 or a prescribed time has elapsed, the process proceeds from step S232 to step S234.

The judgment in step S234 is the same as in step S206, and the system controller 202 judges whether or not the setting operation for the wireless LAN communication line has ended. When all the parameters have not been obtained in the information terminal 300 (step S234, No), the setting operation for the communication line does not end. Therefore, the configuration is made so that, in this case, the process proceeds to step S232, and according to the detection of a change instruction for the picture of code information to be displayed or the elapse of a prescribed time, the process returns to step S222. As illustrated in FIG. 4B, in the embodiment, the configuration is made so that, when the setting operation for the wireless LAN communication line does not end in a normal manner, the process returns to the process of obtaining the first parameter via the judgment in step S232. This is because, in the photographing apparatus 200, it is impossible to recognize which of the parameters the information terminal 300 failed to obtain. In this case, on the rear-side display unit 222, the display is changed from screen #13 to screen #11 in FIG. 5B.

When it is judged in step S234 that the setting operation for the communication line has ended (step S234, Yes), the process is shifted to step S208. In this case, on the rear-side display unit 222, the display is changed from screen #13 in FIG. 5B to screen #20 in FIG. 5A. The processes in and after step S208 are as described above. That is, all the parameters are included in a single piece of code information, and either when using the picture of the code information or when code information is generated for each of the parameters and the plurality of pictures of the code information are used, the communication connection process may be executed in the same manner.

Meanwhile, in the explanation in FIG. 4B and FIG. 5B, when pressing of the icon 134 on screens #11 through #13 is detected, the display is changed to the picture of code information of the next parameter, but this is not a limitation. For example, the configuration may be made so that, when the user presses any of the icons 131 through 133 on screen #11 in FIG. 5B, the display is changed to the picture of code information corresponding to the pressed icon.

In addition, a case is presented in which, when pressing of the icon 134 or the like is still detected in step S232 in FIG. 4B even after display of all the plurality of pieces of information generated by division has ended, display of the divided pictures of code information is continued, but this is not a limitation. For example, the configuration may be made so that the display is brought back to the first display format and the process is shifted from step S232 to step S202 in FIG. 4B. Alternatively, the configuration may be made to shift from step S232 to an error process, or the configuration may be made to present a warning display indicating that the communication connection process did not end in a normal manner, and to terminate the subroutine illustrated in FIG. 4B. Furthermore, the configuration may also be made to make a determination that it was impossible to recognize the code information with the number of divisions set as the initial setting, and to increase the number of divisions.

Next, operations on the information terminal 300 side that issues an operation instruction by remote control to the photographing apparatus 200 are explained with reference to FIG. 6.

Figure 6:
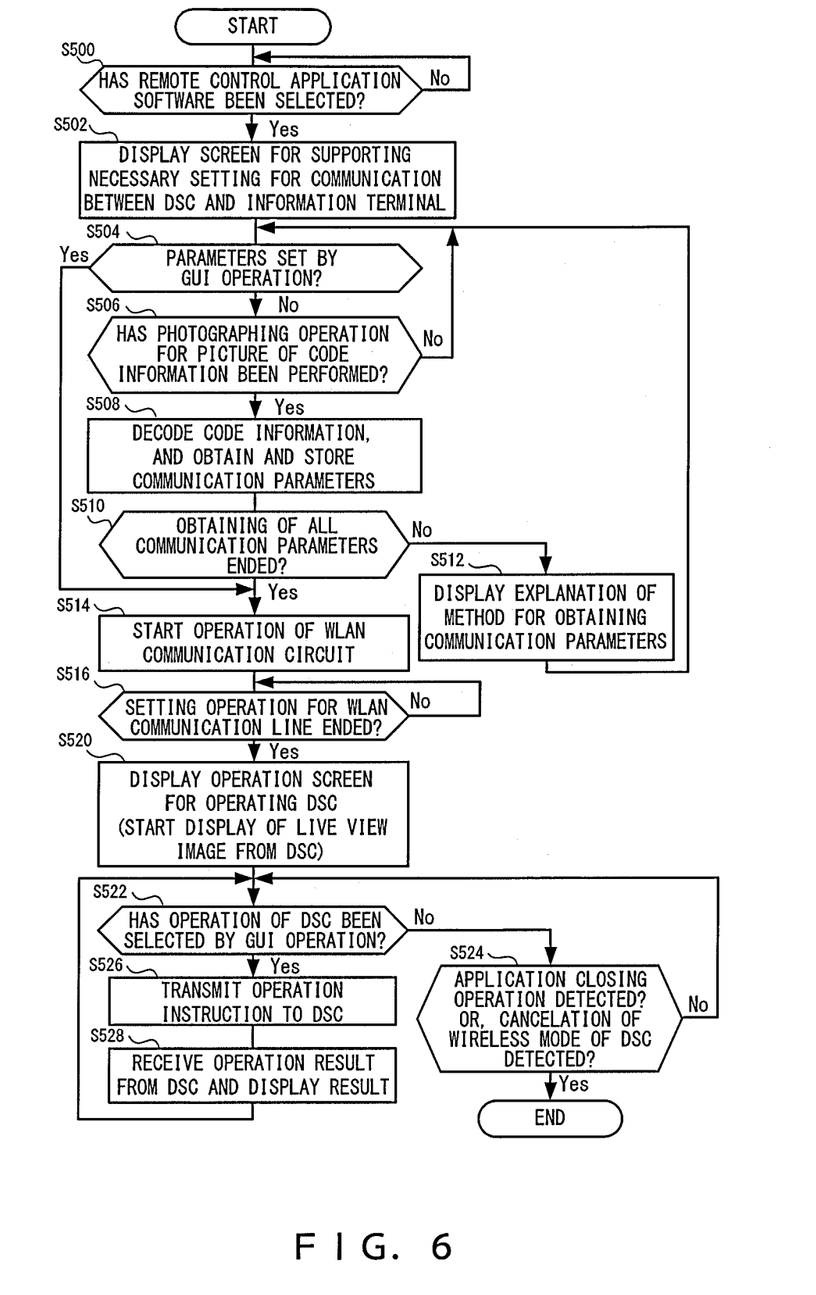
FIG. 6 is a flowchart illustrating an operation process of a remote-control application for a photographing apparatus executed in an information terminal.

FIG. 6 is a flowchart illustrating the operation process of application software for remote control of the photographing apparatus 200 executed in the information terminal 300. It is assumed that the information terminal 300 has downloaded and installed the application software for remote control of the photographing apparatus 200 via the web or the like in advance. In addition, as a precondition for starting the series of processes illustrated in FIG. 6, it is assumed that the information terminal 300 has already been activated.

In step S500, the processor 302 of the information terminal 300 judges whether or not the application software for remote control has been selected. The processor 302 performs the judgment in step S500 by recognizing an operation performed by the user such as tapping a prescribed icon displayed on the display unit 328 of the information terminal 300, or the like. When the application software for remote control is selected, the process is shifted to step S502.

In step S502, the processor 302 displays a screen for supporting a process in which the user sets communication setting information such as communication parameters that are necessary for communication between the information terminal 300 that is its own device and the photographing apparatus 200. Here, for example, a message or the like may be displayed indicating that setting of communication setting information in the information terminal 300 may be performed by taking the picture of the code information displayed on the rear-side display unit 222 of the photographing apparatus 200.

In step S504, the processor 302 judges whether or not parameters have been set by means of a GUI operation. In the case of parameter setting by means of a GUI operation, that is, parameter setting by manual input (step S504, Yes), the process is shifted to step S514. In the case of parameter setting by means other than a GUI operation (step S504, No), the process proceeds to step S506, and the picture of code information displayed on the rear-side display unit 222 of the photographing apparatus 200 is read to perform parameter setting.

In step S506, the processor 302 judges whether or not the operation of taking the picture of code information has been executed in its own device. When the operation of taking the picture of code information has been executed in its own device (step S506, Yes), the process proceeds to step S508, and when the operation of taking the picture of code information has not been executed (step S506, No), the process returns to step S504. Thus, when parameter setting is performed by means other than manual input, the processes in step S504 and step S506 is repeated until the operation of taking the picture of code information is performed.

In step S508, the processor 302 decodes code information obtained by the photographing operation in step S506, to obtain parameters that are necessary for wireless connection to the photographing apparatus 200. When the obtained parameters are stored in a non-volatile memory or the like in the WLAN communication circuit s312, the process proceeds to step S510.

In step S510, the processor 302 judges whether or not obtaining of the communication setting information (all the parameters) has ended. When obtaining of all the parameters has ended (step S510, Yes), the process is shifted to step S514, and when there are parameters that have not been obtained (step S510, No), the process proceeds to step S512.

In step S512, the processor 302 displays a screen for explaining the method for obtaining parameters to the user on the display unit 328, and the process returns to step S504.

An example of the screen displayed in step S512 may be (1) when it is impossible to obtain parameters even by means of a photographing operation, for example, a screen that suggests making the photographing apparatus 200 divide code information and photographing the divided code information. Alternatively, it may be (2) a screen that suggests display of parameters on the rear-side display unit 222 of the photographing apparatus 200 and setting of these by means of a GUI operation (by manual input). Furthermore, it may be (3) when some of the parameters have been obtained at the information terminal 300 as a result of divided display of code information in the photographing apparatus 200, a screen that suggests further execution of a photographing operation for a new picture of code information.

Meanwhile, the case in which it is judged in step S510 that "obtaining of all the parameters has ended" may be (1) when the single picture of code information including all the parameters was successfully read, as illustrated as an example in screen #10 in FIG. 5A, and (2) when each of the plurality of pictures of code information including the respective parameters was successfully read, as illustrated in screens #11 through #13 in FIG. 5B. Furthermore, it may be (3) when some of the parameters are obtained from some of the plurality of pictures of code information in FIG. 5B, and the remaining parameters are obtained by means of a GUI operation (manual input by the user).

When all the parameters to be received from the photographing apparatus 200 have been obtained, the process proceeds to step S514.

In step S514, the processor 302 makes the WLAN communication circuit s312 start its operation. In step S516, the processor 302 judges whether or not the setting operation for the WLAN communication line has ended. In step S516, waiting for the setting operation for the WLAN communication line is performed. Then, when processes such as obtaining and registering device information of the photographing apparatus 200 and the like are completed (step S516, Yes), the process is shifted from step S516 to step S520.

In step S520, the processor 302 displays an operation screen for operating the photographing apparatus 200 on the display unit 328. In an example, together with this, display of a live view image transmitted from the photographing apparatus 200 starts on the display unit 328.

In step S522, the processor 302 judges whether or not the GUI on the display unit s328 has been operated by the user and a prescribed operation of the photographing apparatus 200 has been selected. A prescribed operation may be a prescribed photographing operation, a prescribed image processing operation, or the like. When a prescribed operation has been selected (step S522, Yes), the process is shifted to step S526, and when a prescribed process has not been selected (step S522, No), the process is shifted to step S524.

In step S524, the processor 302 judges whether the operation by the user for closing the remote control application selected and activated in step S500 has been detected, or whether or not cancelation of the wireless mode of the photographing apparatus 200 has been detected. When either a closing operation for the remote control application or cancelation of the wireless mode has been detected (step S524, Yes), the process is terminated, and when neither of them has been detected (step S524, No), the process returns to step S522.

In step S526, the processor 302 transmits information representing an instruction for executing a prescribed operation to the photographing apparatus 200. After the transmission, in step S528, the processor 302 receives an operation result transmitted from the photographing apparatus 200 to the information terminal 300 after executing an operation according to the instruction from the information terminal 300 in step S120 in FIG. 4A. When this is displayed on the display unit s328, the process returns to step S522.

Thus, the processor 302 of the information terminal 300 repeats the process described above until the application software for remote control of the photographing apparatus 200 is closed or until the wireless mode of the photographing apparatus 200 is canceled (until the "Yes" case appears in step S524).

As described above, according to the photographing apparatus 200 according to the present embodiment, when making information that is necessary for opening a communication line of the wireless LAN with the information terminal 300 included in code information and making the information terminal 300 read it, a display of the code information is performed according to the situation. For example, when it is impossible for the information terminal 300 to obtain information that is necessary for establishing the communication line from a single picture of code information in the first display format due to the imaging performance of the information terminal 300 or the display resolution of the rear-side display unit 222 of the photographing apparatus 200, the display format is switched to the second display format. In the second display format, a plurality of pictures of code information obtained by dividing a single piece of code information are displayed sequentially one by one on the rear-side display unit 222, and the information terminal 300 is made to read each of them. Accordingly, it becomes possible for the information terminal 300 to more certainly obtain information that is necessary to establish the communication line.

Meanwhile, in the description above, the explanation is given with an example of a case in which the photographing apparatus 200 operates as an access point of a WLAN and executes a prescribed photographing operation or the like according to remote control from the information terminal 300, but this is not a limitation. As illustrated in FIG. 3, in a configuration in which the information terminal 300 is equipped with the imaging unit 304, the information terminal 300 such as a smartphone may execute a prescribed photographing operation by remote control from another electronic device. Even in such a case, a similar effect may also be obtained by storing a control program for having the operation process of the photographing apparatus 200 executed in the non-volatile memory s336 of the information terminal 300, and by executing this program. That is, the configuration may be made so that, in order to establish a wireless communication line of the wireless LAN or the like with another electronic device, the information terminal 300 generates a single piece or a plurality of pieces of code information including communication setting information to be set in the other electronics device, and the other electronic device is made to obtain the communication setting information. In the other electronic device that attempts to establish wireless communication with the information terminal 300, even when it does not have a high imaging performance, it becomes possible to more certainly obtain information that is necessary to establish a communication line with the information terminal 300 by sequentially reading divided pieces of code information.

As described above, an objective of the present invention may be achieved by providing an electronic device with a recording medium in which program code of software that realizes the functions disclosed in the embodiments described above is recorded, and by having the program code stored in the recording medium read and executed by a computer (a microcontroller, a microprocessor, a CPU, an MPU (Micro Processing Unit), etc.) of the electronic device. That is, the program code itself read from the recording medium realizes the functions of the embodiments, and the recording medium in which the program code is recorded forms the present invention.

The functions disclosed in the embodiments are realized not only by the execution of the program code read by the computer. The program code may also use some of the processing functions of the operating system (OS) implemented in the computer of the electronic device.

The computer that executes the program code read from the recording medium is not limited to a single computer. A plurality of computers existing in the electronic device may be connected, so that these computers cooperate and execute the program code. Alternatively, the electronic device and a peripheral device may be connected, and the computers existing in both the devices may be connected, so that these computers operate and execute the program code.

Meanwhile, the present invention is not limited to the embodiments described above themselves, and the present invention may be embodied with modifications of constituent elements without departing from its spirit and scope at the implementation stage. In addition, various inventions may be formed by appropriately combining a plurality of constituent elements disclosed in the embodiments disclosed above. For example, all the constituent elements disclosed in an embodiment may be appropriately combined. Furthermore, constituent elements across different embodiments may also be combined. It goes without saying that various modifications and applications are possible without departing from the spirit and scope of the invention as described above.

The invention claimed is:

1. An electronic device which is capable of displaying a plurality of pieces of information which may be obtained by an imaging operation, comprising:
 a communication unit which performs wireless communication with an information terminal;
 a generating unit which generates code information;
 a display unit which performs display while changing between a first display format in which the generating unit is made to generate a single piece of code information to be displayed including the plurality of pieces of information and a second display format in which the generating unit is made to generate a plurality of pieces of code information individually including the plurality of pieces of information and pictures of the code information are displayed sequentially one by one; and
 a control unit which makes the display unit display the first display format, and which performs a display of the second display format on the display unit when it is impossible to establish the wireless communication with the information terminal by the communication unit within a first prescribed time after displaying the first display format.

2. The electronic device according to claim 1, wherein when it is impossible to establish the wireless communication with the information terminal when the display of the second display format ends after shifting to the second display format, the control unit repeats the display of the second display format.

3. The electronic device according to claim 1, further comprising
 an operation unit which detects an operation of a changing instruction for a display on the display unit by a user, wherein
 upon detecting an instruction for changing a display format from the first display format to the second display format via the operation unit, the control unit generates and displays, on the display unit, icons corresponding to each of the plurality of pieces of code information in the second display format and displays an icon corresponding to a picture of code information that is being displayed on the display unit in a display format that is different from a display format for other icons.

4. The electronic device according to claim 1, further comprising
 an operation unit which detects an operation of a changing instruction for a display on the display unit by a user, wherein
 in the second display format, the control unit sequentially changes code information to be displayed on the display unit among the plurality of pieces of code information according to an output of the operation unit to make pictures of code information be displayed one by one.

5. The electronic device according to claim 1, wherein in the second display format, when a second prescribed time elapses, the control unit sequentially changes code information to be displayed on the display unit among the plurality of pieces of code information to make pictures of code information be displayed one by one.

6. The electronic device according to claim 1, wherein the code information includes a plurality of communication parameters that are necessary when the information terminal performs the wireless communication with the electronic device.

7. The electronic device according to claim 6, wherein in the second display format, each of the plurality of pieces of code information includes one of the plurality of communication parameters.

8. A control method for an electronic device which comprises a display unit, a communication unit which performs wireless communication with an information terminal, a generating unit which generates code information and a control unit, and which is capable of displaying a plurality of pieces of information which may be obtained by an imaging operation, wherein:

the control unit
changes between a first display format in which the generating unit is made to generate a single piece of code information to be displayed including the plurality of pieces of information and a second display format in which the generating unit is made to generate a plurality of pieces of code information individually including the plurality of pieces of information and pictures of the generated code information are sequentially displayed one by one; and
controls the display unit to display the first display format, and performs a display of the second display format on the display unit when it is impossible to establish the wireless communication with the information terminal by the communication unit within a first prescribed time after displaying the first display format.

9. A recording medium recording a control program for causing a microcomputer of an electronic device to execute a process, which is a control program for causing the microcomputer of an electronic device which comprises a display unit, a communication unit which performs wireless communication with an information terminal, a generating unit which generates code information and a control unit, and which is capable of displaying a plurality of pieces of information which may be obtained by an imaging operation, wherein:

the microcomputer
changes between in a first display format in which the generating unit is made to generate a single piece of code information to be displayed including the plurality of pieces of information and a second display format in which the generating unit is made to generate a plurality of pieces of code information individually including the plurality of pieces of information and pictures of the generated code information are sequentially displayed one by one on the display unit; and
controls the display unit to display the first display format, and performs a display of the second display format on the display unit when it is impossible to establish the wireless communication unit within a first prescribed time after displaying the first display format.

10. The electronic device according to claim 1, wherein each of the single piece of code information and the plurality of pieces of code information encode parameters necessary for establishing wireless communication between the electronic device and the information terminal.

11. The control method of claim 8, wherein each of the single piece of code information and the plurality of pieces of code information encode parameters necessary for establishing wireless communication between the electronic device and the information terminal.

12. The recording medium of claim 9, wherein each of the single piece of code information and the plurality of pieces of code information encode parameters necessary for establishing wireless communication between the electronic device and the information terminal.

* * * * *